(12) United States Patent
Paschkewitz et al.

(10) Patent No.: US 10,850,236 B2
(45) Date of Patent: Dec. 1, 2020

(54) LOW DISPERSION, FAST RESPONSE MIXING DEVICE

(71) Applicant: PALO ALTO RESEARCH CENTER INCORPORATED, Palo Alto, CA (US)

(72) Inventors: John Steven Paschkewitz, McLean, VA (US); David Mathew Johnson, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 935 days.

(21) Appl. No.: 14/840,964

(22) Filed: Aug. 31, 2015

(65) Prior Publication Data

US 2017/0056843 A1 Mar. 2, 2017

(51) Int. Cl.
*B01D 61/36* (2006.01)
*B01F 5/04* (2006.01)
(Continued)

(52) U.S. Cl.
CPC .......... *B01D 61/36* (2013.01); *B01F 3/0807* (2013.01); *B01F 5/0473* (2013.01);
(Continued)

(58) Field of Classification Search
CPC .... B01F 3/0807; B01F 5/0473; B01F 5/0478; B01F 13/0059; B01F 15/0404; B29C 64/112; B01D 61/36
(Continued)

(56) References Cited

U.S. PATENT DOCUMENTS

| 3,635,444 A | | 1/1972 | Potter | |
|---|---|---|---|---|
| 3,712,513 A | * | 1/1973 | Ashmead | ............ B01F 15/0404 137/205.5 |

(Continued)

FOREIGN PATENT DOCUMENTS

| EP | 1600276 A1 | 11/2005 |
|---|---|---|
| JP | 2005279458 | 10/2013 |

(Continued)

OTHER PUBLICATIONS

European Search Report, EP 16184781.9, dated Jun. 22, 2017, 14 pp.

(Continued)

*Primary Examiner* — Marc C Howell
(74) *Attorney, Agent, or Firm* — Miller Nash Graham & Dunn LLP

(57) ABSTRACT

A mixing system has a parallel droplet dispenser capable of making droplets of a first working material in the range of 10 nanometers to 10 micrometers, a pump to deliver fluid for the droplets of the first working material and to produce a first emulsion, a compact mixer having low inter-voxel mixing to receive the emulsion and produce a homogenous material, and a dispensing system. A method of dispensing a graded material includes generating droplets of a first working material, the droplets having a size in the range of 10 nanometers to 10 micrometers, adding the droplets of the first working material into a fluid to create a first emulsion, wherein addition of the droplets of the first working material is controlled to create gradient in the emulsion, mixing the first emulsion to create a homogenous, graded mixture, and dispensing the homogenous, graded mixture onto a surface.

9 Claims, 5 Drawing Sheets

(51) Int. Cl.
  *B01F 15/02* (2006.01)
  *B01F 3/08* (2006.01)
  *B01F 15/04* (2006.01)
  *B01F 13/00* (2006.01)
  *B29C 64/112* (2017.01)
  *B33Y 70/00* (2020.01)

(52) U.S. Cl.
  CPC ........ *B01F 5/0478* (2013.01); *B01F 13/0059* (2013.01); *B01F 15/0243* (2013.01); *B01F 15/0404* (2013.01); *B29C 64/112* (2017.08); *B33Y 70/00* (2014.12)

(58) Field of Classification Search
  USPC ..................................................... 366/152.1
  See application file for complete search history.

(56) References Cited

U.S. PATENT DOCUMENTS

| | | | |
|---|---|---|---|
| 4,946,795 A | 8/1990 | Gibbons et al. | |
| 7,344,681 B1 | 3/2008 | Fiechtner | |
| 7,484,881 B2 | 2/2009 | Schulz-Hanke et al. | |
| 7,927,552 B2 | 4/2011 | Cho et al. | |
| 8,528,589 B2 | 9/2013 | Miller et al. | |
| 8,591,093 B2 | 11/2013 | Schoenfeld | |
| 8,616,227 B1 | 12/2013 | Facer et al. | |
| 2004/0228882 A1 | 11/2004 | Qui Dongming et al. | |
| 2005/0167370 A1* | 8/2005 | Nakajima ............ B01F 3/0807 210/767 |
| 2005/0238721 A1 | 10/2005 | Acquarulo | |
| 2006/0120213 A1* | 6/2006 | Tonkovich ............ B01F 3/0807 366/144 |
| 2010/0188466 A1 | 7/2010 | Clarke | |
| 2013/0257996 A1 | 10/2013 | Panchawagh et al. | |
| 2015/0065396 A1* | 3/2015 | Kiani ................ B01L 3/502784 506/26 |

FOREIGN PATENT DOCUMENTS

| | | |
|---|---|---|
| WO | 2006057895 A2 | 6/2006 |
| WO | 2007039300 A1 | 4/2007 |

OTHER PUBLICATIONS

European Search Report, EP 16184781.9, dated Jan. 25, 2017, 9 pp.

* cited by examiner

LOW DISPERSION, FAST RESPONSE MIXING DEVICE

TECHNICAL FIELD

This disclosure relates to rapid mixing of highly viscous materials, more particularly to rapid mixing of highly viscous materials in small volumes such as those used in digital printers.

BACKGROUND

Mixing is a common problem and there are many different approaches. However very few of them are appropriate for use in a high-resolution digital functional gradient manufacturing system. A digital functional gradient system is one that deposits materials having varying concentrations of different substances. The materials used usually have high viscosity. For example, typical UV curable three-dimensional printing resins have viscosities roughly 10 to 1000 times higher than water. Thermoset resins, also typically have viscosities much higher than that of water and the viscosity can be increased even higher with the addition of reinforcement agents such short fibers. In order to achieve high resolution, the absolute size of a bead or drop of material is small. The combination of high viscosity and small geometry means that the Reynolds number is much less than 1. The Reynolds number is the ratio of inertial forces to viscous forces and consequently quantifies the relative importance of these two types of forces for given flow conditions.

One goal behind mixing is to create the shortest possible diffusion path length, or in the case of immiscible polymer blending, to achieve nano-scale emulsion, by repeated cutting, folding and stretching operations. This is typically referred to as distributive mixing. At some very small diffusion path length, typically in the microns to nanometer scale, the material becomes sufficiently distributive such that diffusive mixing occurs.

In a digital functional gradient manufacturing system, the ratio of the mix changes as the system deposits the material. In order to be able to control this gradient of mixture, the mixing must be achieved in a way that the components of a deposited material are mixed within a voxel (or volumetric pixel), but that nearby voxels are not mixed together substantially. The discussion here refers to mixing between voxels as upstream and downstream of flow, while mixing within voxels is characterized by cross flow mixing.

Current approaches include static line mixers, twin-screw mixers and microfluidic mixers, but none of them solves these particular problems. In-line static mixers achieve multiple stretching and folding operations that reduce diffusion path length, but have high dispersion upstream and downstream. Twin-screw mixers typically achieve polymer compounding with multiple stretching and folding operations for extremely viscous fluids but have extremely high upstream and downstream dispersion.

Microfluidic mixers use droplet fission, flow instabilities, or valves to achieve mixing, but these are typically demonstrated in aqueous media with significantly lower viscosities. Active mixers are highly complex concepts. These approaches use small chambers with stir bars, acoustics or electrical fields, but these do not work well with high viscosities and the small scales of interest in digital function material printing.

SUMMARY

One embodiment is a mixing system has a parallel droplet dispenser capable of making droplets of a first working material in the range of 10 nanometers to 10 micrometers, a pump to deliver fluid for the droplets of the first working material and to produce a first emulsion, a compact mixer having low inter-voxel mixing to receive the emulsion and produce a homogenous material, and a dispensing system.

Another embodiment is a method of dispensing a graded material includes generating droplets of a first working material, the droplets having a size in the range of 10 nanometers to 10 micrometers, adding the droplets of the first working material into a fluid to create a first emulsion, wherein addition of the droplets of the first working material is controlled to create gradient in the emulsion, mixing the first emulsion to create a homogenous, graded mixture, and dispensing the homogenous, graded mixture onto a surface.

DETAILED DESCRIPTION OF THE EMBODIMENTS

Figure 1:
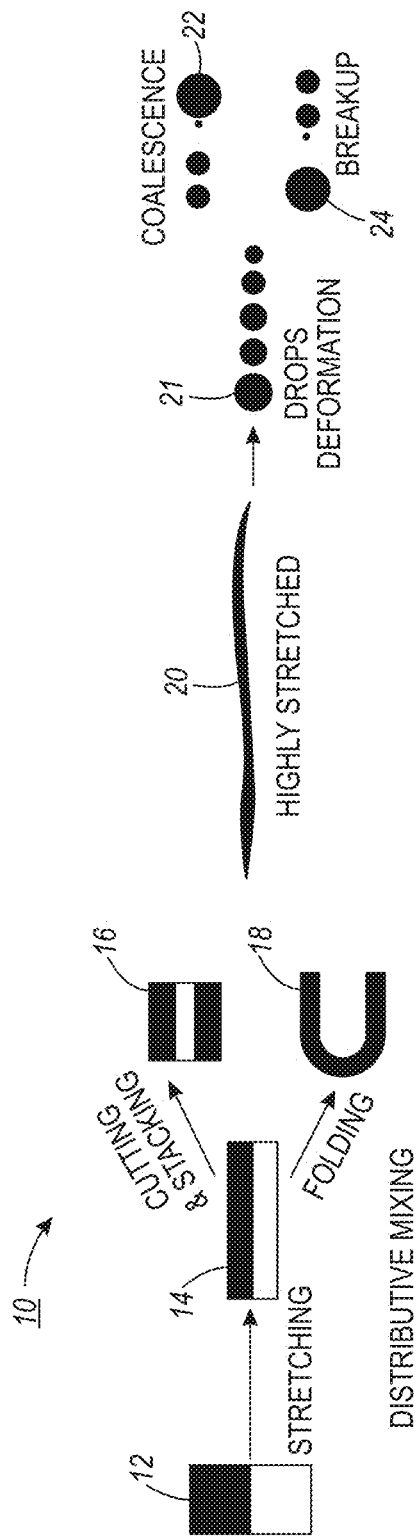
FIG. 1 shows a prior art embodiment of mixing.

FIG. 1 shows a prior art process 10 for mixing. The majority of operations in static or twin mixers create surface area, referred to here as distributive mixing. As shown in FIG. 1, the original material 12, most likely a high viscosity fluid undergoes stretching between 12 and 14. The mixer then cuts and stacks the material to create surface area as in 16 or folded as in 18, or more than likely a combination of both. Another method available for mixing is dispersive mixing. The process typically stretches the material at 20 and the material breaks into droplets at 22. Droplets break up as in 22 or coalesce as in 24, in single or multiple steps. Repetition and combinations of these steps generally leads to better dispersion. For example, one might start by taking a mixture of fluids through distributive mixing and then doing dispersive mixing. Multiple mixing steps that lead to good cross flow dispersion, often also lead to significant upstream and downstream dispersion.

It is possible to skip multiple steps in the process by creating an emulsion of small droplets directly and varying the composition of the emulsion. This allows a relatively short mixing section with limited upstream and downstream dispersion to create a homogenous graded material with controlled and sharp changes in composition. The changes in composition provided digitally graded material for deposition on a substrate.

The dispersion of the mixed material can be defined as a measure of the degree of variation in composition across a volume. Various statistical measures can be made to quantify the degree of dispersion across a fluid domain. This can be measured across an entire fluid domain or a subset of that domain. For example, one can measure the dispersion of a mixed voxel, or between several voxels.

In the following discussion, "low dispersion" means a dispersion of a first fluid into a second fluid having a coefficient of dispersion less than 1. A "compact mixer" is one that has a size that has a working volume close to the size of a single voxel or less. A "voxel" is a volumetric pixel. The compact mixers under discussion here have 'low' inter-voxel mixing, defined as less than 10% cross-voxel mixing. Much like pixels, or picture elements, voxels have a resolution depending upon their size. For a droplet based deposition system, such as a printer, the resolution generally correlates to the size of the deposited droplet. For a continuous extrusion process such as a digital functional gradient manufacturing machine, the size of a voxel relates to the cross section of the extrusion and the rate at which the composition of the extrudate can be changed.

One issue that arises in creating an emulsion lies in the dispensing of one material into another with sufficiently small droplet size to create an emulsion with little or no required additional mixing. However, it is possible. Several calculations support the viability of the embodiments here. For a voxel size of 100 microns, one assumes a hemisphere having a diameter of 100 microns to give a volume of roughly 250 Pico liters. For a deposition speed of 1 cm/s or 10,000 microns/sec, the rate of deposition for 100-micron voxels is 100 voxels/sec. In the most extreme case, when a voxel is mixed on demand and then immediately deposited, a mixer must be able to mix the voxel in less than 0.01 s. However, it is possible to mix multiple voxels simultaneously. Mixing multiple voxels increase the complexity and size of the deposition system, but decreases the performance requirement on the mixer.

To make a material with 50% volume fraction, it is necessary to inject 125 Pico liters/sec of each material. Each material may be injected directly into the other fluid or a neutral carrier fluid that is not part of the final mixture. In order to estimate the size of droplets needed, one must calculate the diffusion rate. As an example, the diffusivity of fluorescein dye in 70,000 MW 8 g/dl dextran has been estimated to be approximately $4 \times 10^{-10}$ m$^2$/s. If one assumes the mixing materials have diffusivities of 2 orders of magnitude slower, given a mixing time target of 0.01 s, a reasonable diffusion length estimate is 0.2 microns.

Under these conditions, it would be ideal to produce droplets with a diameter of 0.2 microns or less. In order to achieve the deposition rates required for droplets produced on demand, 250,000 droplets must be produced every 0.01 seconds or 2.5 million droplets/s.

It is worth noting that unlike a large number of small droplet dispensing techniques the distribution of droplet sizes is not of primary importance. These droplets are primarily used to create surface area between the fluids being mixed and will eventually be all mixed to together, so it is only important that the total dispensed volume is accurate. Even a system with a high coefficient of variation can achieve this by dispensing a large number of droplets.

While 2.5 million droplets could be created per second using a high speed, such as a 100 kHz piezo actuator and thousands of nozzles, the mixing operations for a voxel do not necessarily need to be done within the deposition rate for one voxel. The system may generate droplets upstream at a reduced rate that is easily accessible using other established means. Alternatively, it is possible to create larger drops that achieve the correct volume fraction and use downstream mixing to complete the creation of the required surface area.

A number of methods exist to produce small droplets of less than 1 micron. Using flow focusing architectures, such as extensional flows or elongational flows, it is possible to make drops using simple to fabricate geometries that can produce droplets on the order of a micron or less. References exist that show parallel nozzles for emulsion generation that can produce droplets on the order of 5 microns in a controllable, stable and robust manner. Spray techniques such as electrospray or filament extension atomization can produce large quantities of smaller particles, though another apparatus is required to modulate the quantity of droplets.

Figure 2:
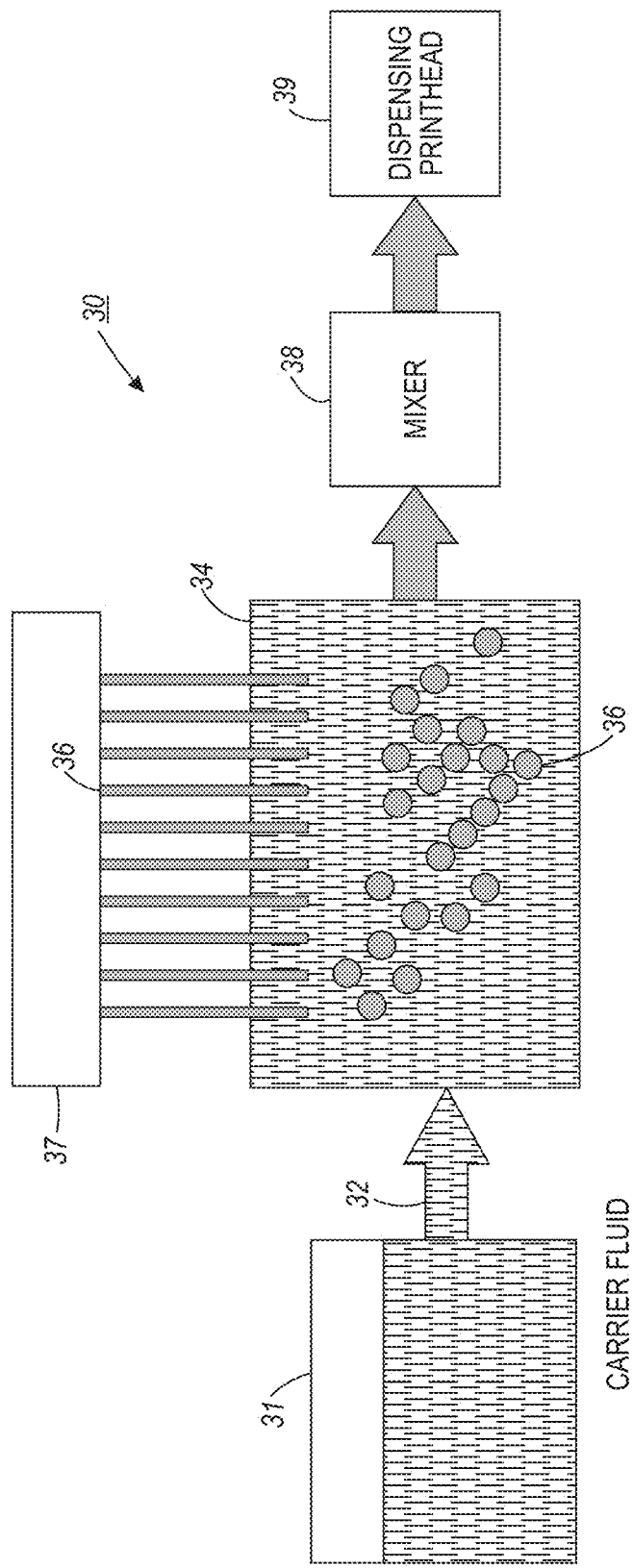
FIG. 2 shows a system diagram of a mixer.

The above discussion demonstrates that it is possible to achieve rapid and low axial dispersion mixing for the digital deposition of graded materials. U.S. patent application Ser. No. 14/578,044, "SYSTEM FOR DIGITAL FABRICATION OF GRADED, HIERARCHICAL MATERIAL STRUCTURES," filed Dec. 29, 2014 teaches an embodiment of this type of system. These systems typically employ some kind of mixer, such as shown in FIG. 2. FIG. 2 shows an embodiment of a droplet mixer for a digital functional graded material (DFGM) print head.

The droplet mixer 30 has a first source of a carrier fluid 32. The source may be a tank, reservoir or other container 31. As will be discussed in more detail later with reference to FIGS. 3-5, the carrier fluid may also consist of a second polymer material. The reservoir 34 allows the first polymer material 36 to be injected into the carrier fluid 32 in the form of small droplets. The injection of the droplets will typically be under the control of some sort of positive placement system such as a pump or other injector 37.

The reservoir 34 represents the portion of the system creating the emulsion that would otherwise require a distributive mixing system, the replacement of which makes the system smaller and faster than using multiple mixing steps. By creating significant surface area directly, there is no need for distributive steps. After the creation of the emulsion, the emulsion may undergo further downstream mixing at 38 and then is dispensed at printhead 39.

Figure 3:
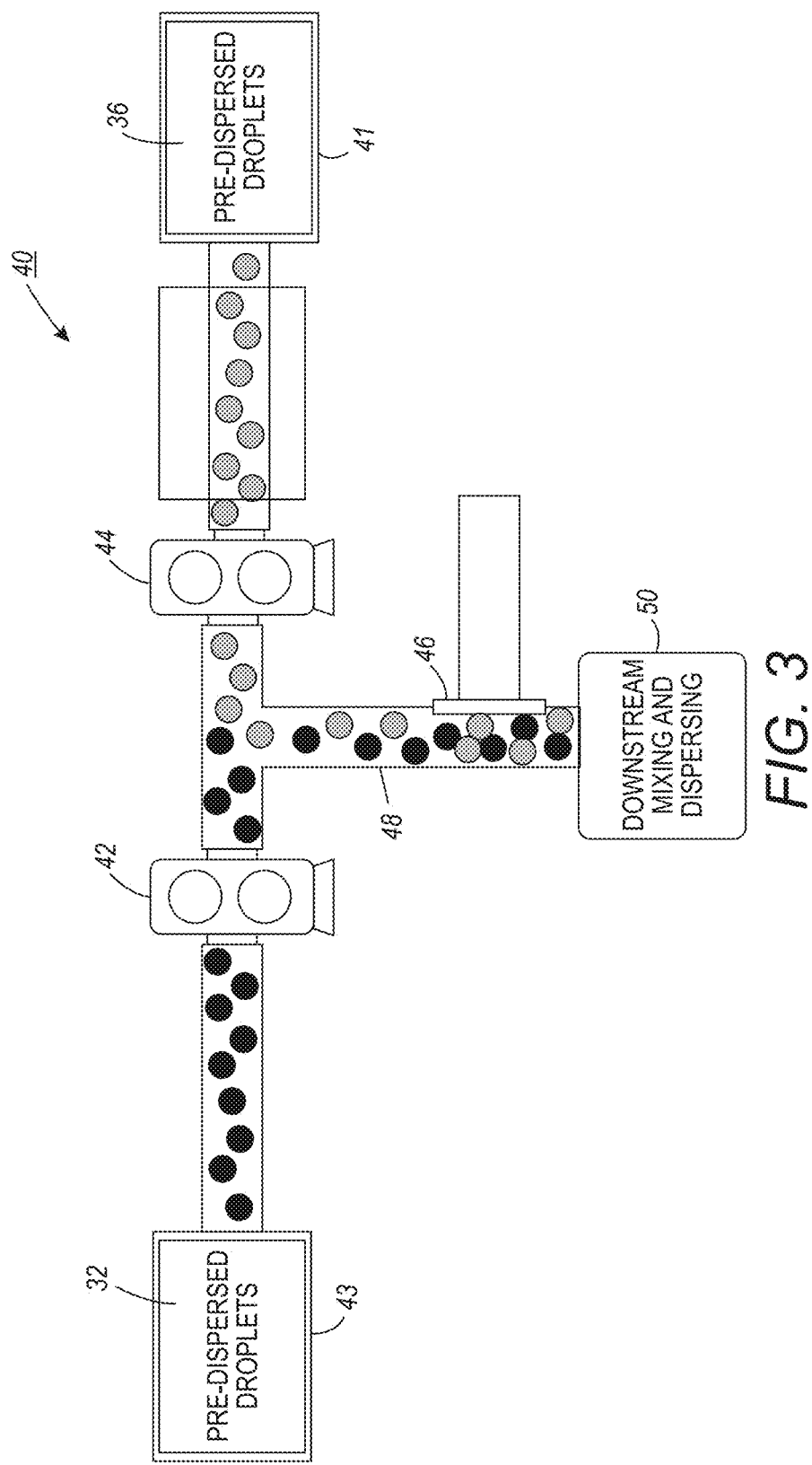
FIGS. 3-5 show alternative embodiments of a mixing system.
Figure 4:
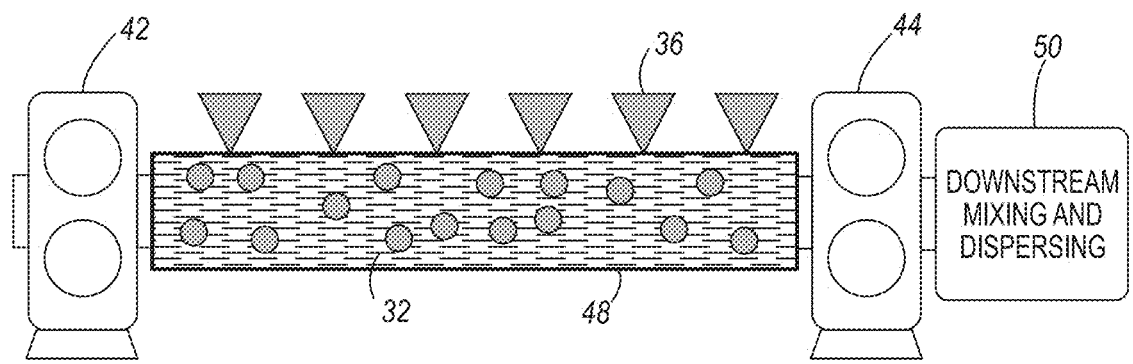
Figure 5:
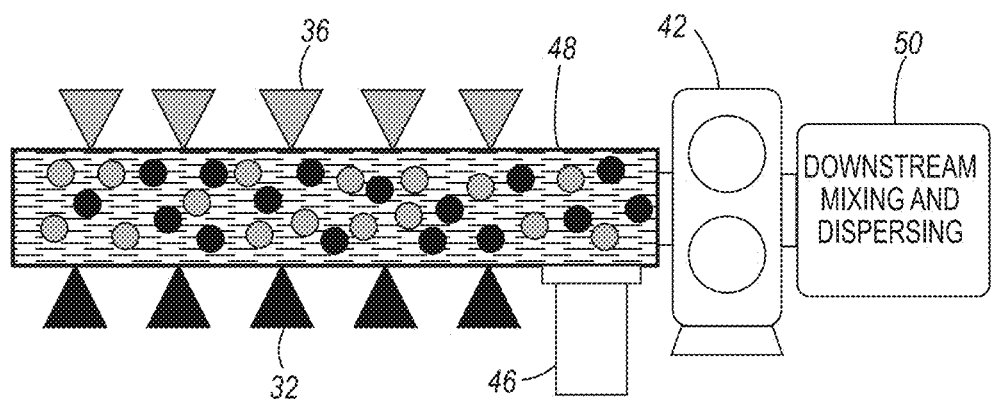

The embodiments of this system may take one of many forms. FIGS. 3-5 show some embodiments of different configurations, with the understanding that these are merely examples and should not limit in anyway the scope of the claims. FIG. 3 shows an embodiment in which the droplets of two different materials disperse into a same immiscible carrier liquid, one that cannot undergo mixing or blending. The first material 36 pre-disperses into the carrier fluid at reservoir 41 and the second material 32 is pre-dispersed into the carrier fluid at reservoir 43. Pumps 42 and 44, which may consist of gear pumps, then pump the material out of the reservoirs into a common channel 48. The ratio of the first and second material mixed is controlled by the relative flow rate of the pumps. A selective membrane 46 before the mixing and dispensing at 50 allows the carrier fluid to be removed. The carrier fluid can be recycled and reused.

This system has the advantage of having easily controlled dispensing systems at a much larger scale than small droplet dispensing systems and a consistent, upstream process that may lack variation can create the small droplets. Examples include electrosprays or filament extensional atomizers. This allows droplet creation systems that may otherwise be difficult to engineer into the system In the embodiment 40 of FIG. 4, a second fluid 32 and the first fluid 36 disperse into the common channel 48. The pump 42 enables the injection into the second fluid. The pump 44 pulls the liquid from the common channel and sends it to the downstream mixing and dispensing 50. The ratio of the first fluid and second fluid change by altering the rate of droplet dispensing of the first fluid in relation to the gear pump 42. The flow rate of the second optional gear pump 44 must equal the flow rate of the first pump 42 plus the flow rate of the droplet dispenser. In some embodiments, one of the fluids may contain reinforcement agents, such as carbon fiber. In order to avoid making small droplets of reinforced material, the preferred embodiment is to dispense the material without reinforcement into the fluid with reinforcement.

FIG. 5 shows an embodiment in which the system dispenses the droplets of both materials into a carrier fluid, which later separates from the entire mixture before mixing and dispensing. In FIG. 5, the system dispenses the two polymers 32 and 36 into the common channel 48. The pump 42 provides positive displacement to inject the fluids and moves the mixed fluid downstream to the mixing and dispensing 50 through the separator, in this embodiment the separator consists of membrane 46.

One of the controlling factors in drop wise dispensing accuracy and precision is the pinch off behavior of the droplet. Both the surfaces of the dispensing apparatus and the fluid into which the droplet is being dispensed impacts this behavior. Controlling the fluid into which the droplet is dispensed reduces the systematic errors and non-linearity in the system due to change in the fluid into which the droplet is being dispensed.

Figure 6:
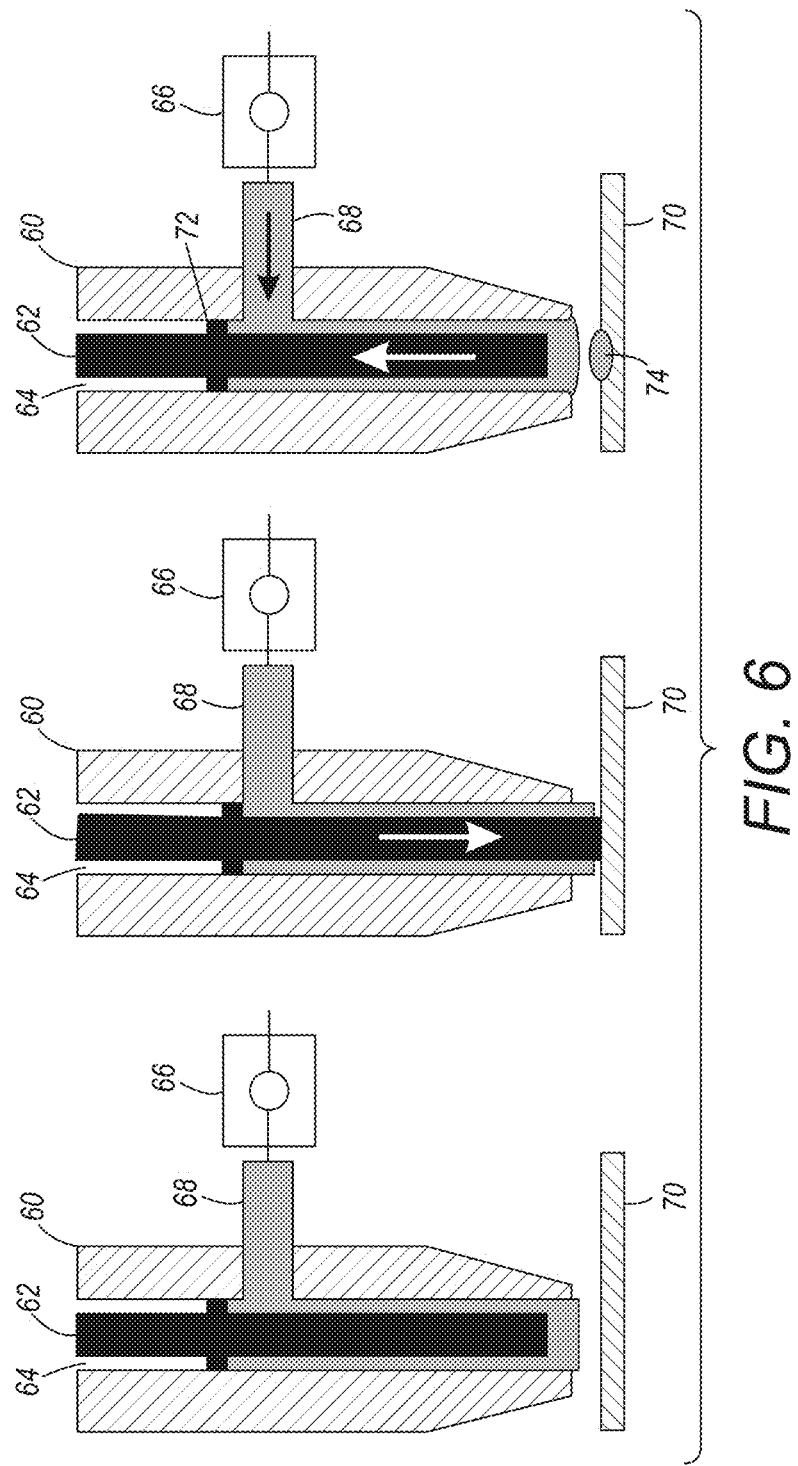
FIG. 6 shows embodiments of a deposition nozzle.

For higher viscosity fluids, such as those of interest here, one method of injection the droplets into another liquid uses a positive displacement system. A positive displacement system applies some sort of positive force on the fluid injected into the other fluid. One possibility consists of a capillary and small piston. The piston actuates in the capillary to dispense a droplet of the fluid. FIG. 6 shows an example of such a system.

The dispenser 60 has a channel 64 in which a piston 62 moves. A single droplet system converts to a continuous droplet system with the addition of a one-way valve 66 that controls the flow of the fluid 68. The piston starts in the neutral position and then moves in a downward direction to touch the surface 70. This may increase the accuracy and decrease the droplet size. When dispensing into another fluid, the surface 70 may be the bottom of the common channel 48 from the previous figures, or the reservoirs for the fluids. After dispensing the drop 74 on the surface, the piston moves upwards in the channel 62 as shown by the arrow. The system draws new fluid 68 through the one-way valve 66. The piston may have a seal 72 that prevents the fluid from moving in the wrong direction in the dispenser.

In this manner, a faster and smaller mixer can provide graded materials as part of a digital deposition system or printhead. By controlling the flow of the two materials relative to each other, one can finely control the concentrations of the different polymers to have sharp changes in composition, creating the gradations desired. The use of a droplet generator to create the emulsion eliminates the need for distributive mixing and allows the mixer to be smaller and mix fluids faster to reduce the overall volume in the system.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A mixing system, comprising:
a first parallel droplet dispenser capable of dispensing droplets of a first working material in the range of 10 nanometers to 10 micrometers, the parallel droplet dispenser having at least one channel, and each channel having a piston, wherein the piston is movable within the channel to dispense drops of the first working material;
a first pump to deliver a carrier fluid to receive the droplets of the first working material and to produce a first emulsion, wherein the carrier fluid contains a second working material, and the pump is configured to control a flow rate of the carrier fluid that determines a ratio of the first working material to the second working material in the carrier fluid;
a compact mixer with low inter-voxel mixing to receive the first and second working materials in the carrier fluid and produce homogenous voxels of material such that control of the droplets of the first working material being received into the carrier fluid and control of the flow of the carrier fluid allows creation of a digitally graded functional material;
a fluid separator to separate out the carrier fluid from the first and second working materials; and
a dispensing system.

2. The mixing system of claim 1, wherein the fluid separator comprises one of a membrane and an evaporator.

3. The mixing system of claim 1, further comprising a second droplet dispenser capable of making droplets of the second working material in the range of 10 nanometers to 10 micrometers and dispensing the droplets of the second working material into the carrier fluid.

4. The mixing system of claim 3, further comprising a second pump to deliver the carrier fluid to receive the droplets of the second working material and to produce a second emulsion.

5. The mixing system of claim 4, wherein the second pump delivers the carrier fluid into which the droplets of the second material are dispersed to produce the second emulsion.

6. The mixing system of claim 5, wherein the mixer receives the first emulsion and the second emulsion.

7. The mixing system of claim 1, wherein the carrier fluid contains the second working material as an emulsion of the second working materials.

8. The mixing system of claim 7, further comprising a second pump to deliver the second working material.

9. The mixing system of claim 1, wherein the droplet dispenser also dispenses droplets of the second working material into the carrier fluid.

\* \* \* \* \*